L. M. LA ROQUE.
VEHICLE TOP.
APPLICATION FILED SEPT. 2, 1914.

1,158,815.

Patented Nov. 2, 1915.

Witnesses

L. M. La Roque
Inventor
by C. A. Snow & Co.
Attorneys

UNITED STATES PATENT OFFICE.

LLOYD M. LA ROQUE, OF KINSTON, NORTH CAROLINA, ASSIGNOR TO ELLIS CARRIAGE WORKS, INC., OF KINSTON, NORTH CAROLINA.

VEHICLE-TOP.

1,158,815.

Specification of Letters Patent.

Patented Nov. 2, 1915.

Application filed September 2, 1914. Serial No. 859,907.

*To all whom it may concern:*

Be it known that I, LLOYD M. LA ROQUE, a citizen of the United States, residing at Kinston, in the county of Lenoir and State of North Carolina, have invented a new and useful Vehicle-Top, of which the following is a specification.

The present invention appertains to vehicle top supports or rails and aims to provide a novel and improved detachable support or rail for a buggy or other vehicle top.

It is the object of the present invention to provide unique means for detachably applying a vehicle top support or rail to the side or end of a buggy or vehicle seat, whereby when the top is removed or out of use, the support or rail as well as the top may be removed from the buggy or vehicle seat, in order that the seat will not be encumbered, and will be neater in appearance.

It is also within the scope of the present invention to provide a detachable vehicle top support of comparatively simple, substantial and inexpensive construction, which may be applied to various vehicle seats, which may be readily attached to and removed from the seat, and which will otherwise be convenient, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1:
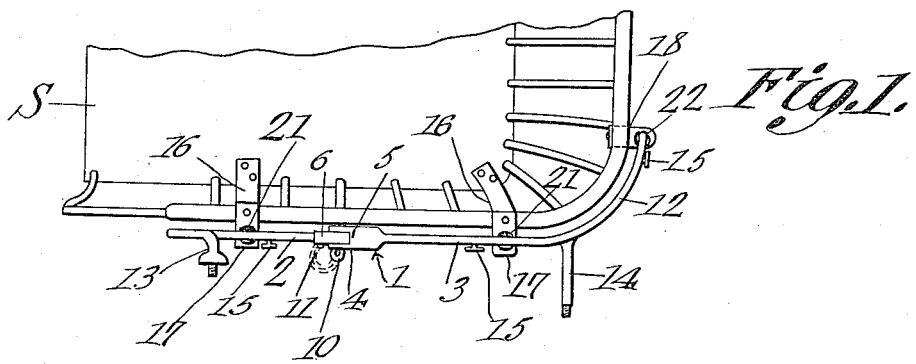
Figure 2:
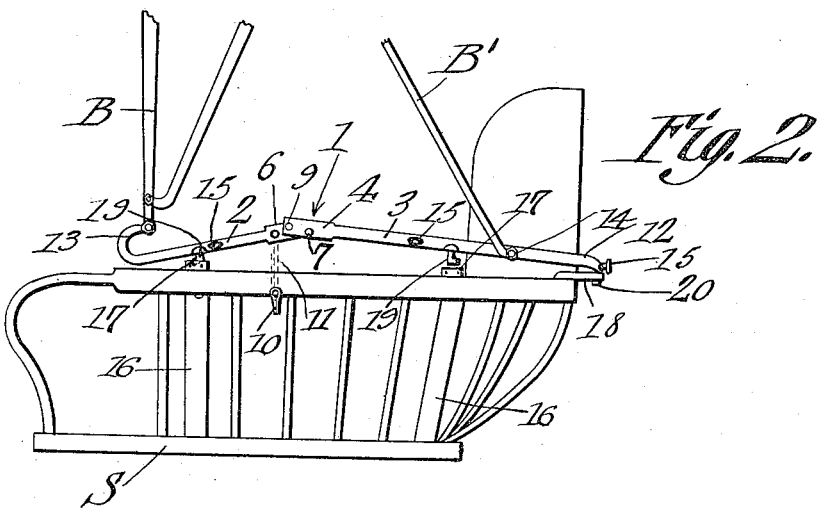
Figures 3, 4:
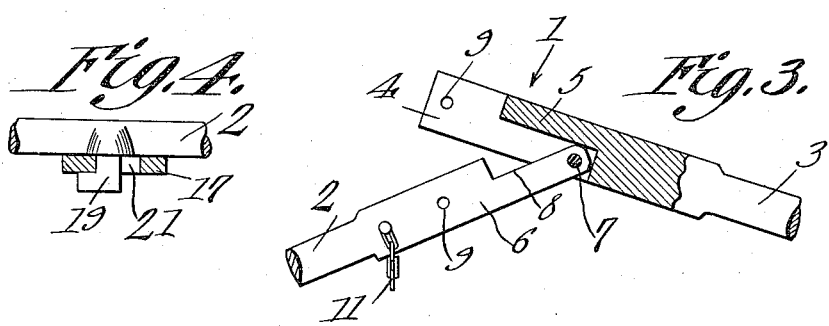

Figure 1 is a plan view of one of the supports or rails as applied to a vehicle seat. Fig. 2 is a side elevation of the support or rail illustrating the same in broken position for the purpose of attachment or removal. Fig. 3 is an enlarged fragmental detail of the joint of the support or rail. Fig. 4 is an enlarged fragmental detail illustrating one of the hooks of the support or rail engaging the corresponding ear of the seat.

In carrying out the present invention, one of the supports or rails 1 is employed at each side or end of the vehicle seat S, whereby the ends of the bow B and brace B' may be pivoted to the opposite supports or rails. In the drawing, only one of the supports or rails is illustrated, since the two are mere duplicates or right and left handed mates.

The support or rail 1 comprises a forward section 2, and a rear section 3, which are provided with a break or rule joint. Thus, the forward end of the rear section 3 is provided with a fork 4, the upper edges of the fork arms being connected by a web 5, and the rear end of the forward section 2 is provided with a tongue or portion 6 pivoted within the fork 4 under the web 5, by means of a rivet or pivot pin 7. The upper edge of the tongue or portion 6 is provided with a recess or cut away portion 8 for receiving the web 5 when the sections 2 and 3 are swung into alinement, and whereby the joint will present a neat and flush appearance.

The free ends of the arms of the fork 4 and the tongue or portion 6 are provided with apertures 9 which are brought into alinement or registration when the sections 2 and 3 are straightened out, whereby a locking pin 10 may be inserted through the apertures 9 to lock the sections 2 and 3 in alinement. The locking pin 10 is preferably carried by a chain or flexible element 11 secured or anchored to the tongue 6, whereby the pin 10 will not become accidentally lost, and will always be handy for insertion through the apertures 9.

The rear end of the rear section 3 is provided with an inwardly curved or bent arm 12 adapted to be passed partially around the back of the seat S as seen in Fig. 1, while the forward end of the forward section 2 is provided with an upwardly and rearwardly bent portion 13 for the pivotal connection of the bow B of the vehicle top. The rear section 3 is also provided with an outstanding finger 14 for the pivotal connection of the brace B', while the sections 2 and 3 are provided with outer buttons or knobs 15 for the engagement of the side curtains of the top.

The seat S is provided with means for the engagement of the support or rail 1, and to this end, upright bars 16 are secured in any suitable manner to the corresponding side or end of the seat and have their upper ends bent angularly to provide outstanding ears 17, while the back of the seat is provided with a similar outstanding ear 18.

The support or rail 1 is provided with means engaging the ears 17 and 18, and to this end, each of the sections 2 and 3 is provided intermediate its ends with a depending hook 19, the two hooks projecting in opposite directions, or away from each other, and the free end of the arm 12 is also provided with a depending hook 20. The hooks 19 and 20 are engageable with the respective ears 17 and 18, the said ears having the respective slots 21 and 22 for the reception of the hooks.

The ears 17 and 18 are so arranged, as to properly coöperate with the hooks 19 and 20, respectively, of the support or rail 1. In applying the support or rail 1 to the seat S, the hook 20 of the arm 12 is first engaged through the slot 22 of the rear ear 18, and the sections 2 and 3 of the support or rail are then swung relative to one another, by breaking their joint, as seen in Fig. 2, in order that the hooks 19 may drop through the slots 21 of the ears 17. Then, by straightening out the support or rail 1, the bills of the hooks 19 will be projected under the ears 17, as suggested in Fig. 4, to lock the support or rail securely upon the ears 17 and 18. The locking pin 10 may then be inserted through the apertures 9 to hold the support or rail in place and to prevent its accidental detachment. The bow B and brace B' of the top may then be applied to the support or rail 1 in the usual manner. It is therefore evident that when the vehicle top is out of use or removed, the support or rail 1 may be readily removed by first withdrawing the locking pin 10, and then breaking the support or rail, so that the hooks 19 and 20 thereof may be withdrawn from the ears 17 and 18, respectively. In this manner, the supports or rails as well as the bow B and brace B' may be detached from the seat S to render the seat neat and unencumbered, when the top is removed. It will be evident, however, that the supports or rails may be readily applied to and removed from the seat, so as to not inconvenience the application and removal of the top.

The hook 20 of the arm 12 being engaged to the rear ear 18, will prevent the support or rail 1 from swinging, and will thereby brace the support or rail when it is applied to the ears 17.

Having thus described the invention, what is claimed as new is:—

1. In a device of the character described, a vehicle top support embodying jointed front and rear sections, the rear section having a rear arm bent to one side, a pair of ears coöperable with the said sections, an ear coöperable with the said arm, each of the said ears having a slot, the said arm having a hook engageable through the last mentioned ear, and the front and rear sections having hooks engageable through the first mentioned pair of ears when the sections are broken and arranged to lock under the said ears when the sections are straightened out, and means for locking the said sections against relative movement when they are straightened out.

2. In a device of the character described, a vehicle top support adapted to be disposed at one side of a vehicle seat and embodying jointed front and rear sections, a pair of members attachable to one side of a vehicle seat, the sections and said members having means adapted to interengage when the sections are broken and then straightened out, and the sections having means at their remote ends for the attachment of a vehicle top.

3. In a device of the character described, a vehicle top support adapted to be disposed at one side of a vehicle seat and embodying jointed front and rear sections, the rear section having an arm bent to one side from its rear end to lie in rear of the seat, a pair of members attachable to one side of a vehicle seat, a third member attachable to the back of the vehicle seat, the said arm and third member having interengageable means, and the sections and said pair of members having means adapted to interengage when the sections are broken and then straightened out.

In testimony that I claim the foregoing as my own, I have hereto affixed my signature in the presence of two witnesses.

LLOYD M. LA ROQUE.

Witnesses:
ERNEST R. TULL,
E. L. WILLARD.

Copies of this patent may be obtained for five cents each, by addressing the "Commissioner of Patents, Washington, D. C."